United States Patent [19]
Heller, Jr.

[11] Patent Number: 5,643,694
[45] Date of Patent: Jul. 1, 1997

[54] ELECTRICAL FEEDTHROUGH FOR AN ELECTROCHEMICAL CELL

[75] Inventor: Bernard F. Heller, Jr., Fridley, Minn.

[73] Assignee: Medtronic, Inc., Minneapolis, Minn.

[21] Appl. No.: 639,225

[22] Filed: Apr. 26, 1996

[51] Int. Cl.⁶ .................................................. H01M 2/06
[52] U.S. Cl. ................................... 429/181; 174/152 GM
[58] Field of Search ............................ 429/181, 178, 429/179, 185; 174/50.61, 152 GM

[56] References Cited

U.S. PATENT DOCUMENTS

| | | | |
|---|---|---|---|
| 3,678,178 | 7/1972 | Hubbauer et al. | 429/181 X |
| 4,166,158 | 8/1979 | Mead et al. | 429/181 |
| 4,210,708 | 7/1980 | Mead et al. | 429/181 |
| 4,226,244 | 10/1980 | Coury et al. | 128/419 P |
| 4,315,974 | 2/1982 | Athearn et al. | 429/181 |
| 4,401,734 | 8/1983 | Meyer et al. | 429/181 |
| 4,460,664 | 7/1984 | Jurva et al. | 429/181 |
| 4,565,093 | 1/1986 | Jurva et al. | 73/40.7 |
| 4,678,868 | 7/1987 | Kraska et al. | 174/152 GM |
| 4,940,858 | 7/1990 | Taylor et al. | 174/152 GM |
| 5,104,755 | 4/1992 | Taylor et al. | 429/181 |
| 5,135,824 | 8/1992 | Jones et al. | 429/178 |
| 5,175,067 | 12/1992 | Taylor et al. | 429/181 |
| 5,294,241 | 3/1994 | Taylor et al. | 65/59.31 |
| 5,306,581 | 4/1994 | Taylor et al. | 429/181 |
| 5,406,444 | 4/1995 | Selfried et al. | 361/302 |

Primary Examiner—Anthony Skapars
Attorney, Agent, or Firm—Thomas F. Woods; Harold R. Patton; Daniel W. Latham

[57] ABSTRACT

An electrical feedthrough apparatus, for an electrochemical cell, is formed by a method that includes forming a feedthrough subassembly by providing a ferrule having an exterior surface and an interior opening about a longitudinal axis therethrough. The interior opening extends along the longitudinal axis of the ferrule from a first end of the ferrule to a second end of the ferrule. An electrical conductor is glassed in the opening of the ferrule. A locating member is positioned onto the ferrule in contact with the exterior surface of the ferrule in proximity to the first end of the ferrule and the locating member has a length extending beyond the second end of the ferrule. The feedthrough subassembly is then located at a position in a mold using the locating member and held in the position with the use of the locating member while insulating material is injected into the mold.

16 Claims, 4 Drawing Sheets

ELECTRICAL FEEDTHROUGH FOR AN ELECTROCHEMICAL CELL

FIELD OF THE INVENTION

The present invention relates to electrochemical cells. More particularly, the present invention relates to electrical feedthroughs for use in electrochemical cells and methods for forming such feedthroughs.

BACKGROUND OF THE INVENTION

Electrical feedthroughs serve the purpose of providing an electrical circuit path extending from the interior of a hermetically sealed container to an external point which is electrically insulated from the container itself, such as in an electrochemical cell. Many such feedthroughs which provide such an electrical path are known in the art. A principal difficulty with electrical feedthroughs lies in the continuing miniaturization of electrochemical cells, and the resulting requirements for correspondingly smaller feedthrough dimensions. For example, various electrochemical cell designs require low profile feedthroughs, i.e. feedthroughs having a very low height. Providing an adequate electrical insulation system for such low profile feedthroughs is difficult.

Various electrical feedthroughs, including the feedthrough described in the present application, are employed in conjunction with electrochemical cells to provide for an electrical path to an anode or cathode within the cell. Such electrochemical cells are used in implantable medical devices, such as cardiac pacemakers, and in conjunction with complex miniaturized electronic circuits. Electrochemical cells, such as the lithium/iodine cell as described in U.S. Pat. No. 4,166,158 entitled "Lithium-Iodine Cell" and U.S. Pat. No. 4,460,664 entitled "Electrochemical Cell for Facilitating Hermeticity Leakage Testing of an Electrical Feedthrough," possess an active cathode which is capable of attacking many materials used in electrical feedthroughs and can migrate along electrical leads to cause circuit malfunction. Therefore, the insulating system of the feedthrough is of significant importance.

Electrical feedthroughs typically include a metal ferrule which retains an electrical lead, and a seal means, usually glass. The ferrule is attached, as by welding, to the casing or cover of an electrochemical cell container and has a portion which extends into the interior of the container, and a portion which extends exteriorly of the container. The lead, retained in the feedthrough and in the interior of the container, must be insulated or protected from the electrochemically active cathode material of the electrochemical cell; for example, as described in the aforementioned U.S. Pat No. 4,166,158.

In conventional feedthrough insulation systems and methods of making the feedthrough, for example, the height to diameter ratio of the feedthrough is typically about 2 or greater. The ferrule for the feedthrough is generally welded into the cover of the cell and then the lead is glassed into the ferrule. The ferrule typically has a shoulder on it for location during an injection molding process and also for welding purposes. After the lead is glassed into the ferrule, an insulator is injection molded onto the ferrule using the cover and/or shoulder of the ferrule for positioning the ferrule in the mold in the injection molding process. The insulator is typically a fluoropolymer. The cover and/or shoulder on the ferrule used for location orient the ferrule in the mold and create a sealed cavity required for injection molding the insulator onto the ferrule. A good seal between a mold and part is needed for the high injection pressures utilized.

Feedthroughs that are molded discretely without covers, typically provide a shoulder of adequate size to create the sealed cavity between the part and the mold and to prevent the ferrule from moving around in the mold during the injection molding process.

In some designs of electrochemical cells, the ferrule cannot be welded to a cover prior to glassing the lead into the ferrule. Thus, in order to accomplish injection molding by conventional means, the ferrule requires a shoulder of adequate size that can be used for locating the ferrule in a mold and creating a seal with the mold during injection molding. However, because of the reduced height of the ferrules for particular designs, limited insulation distance is provided to electrically insulate the lead retained in the feedthrough from the cathode material of the electrochemical cell if such a shoulder of the ferrule is included. As a result, conventional locating and sealing of the ferrule in a mold using a ferrule shoulder is inadequate for providing an insulation system for the feedthrough when using injection molding and further, without an adequately sized shoulder or use of the cover to retain the ferrule in place during the injection molding process, the ferrule tends to undesirably move during the injection molding process. Although various other insulation techniques are available for providing the electrical insulation necessary for a feedthrough of an electrochemical cell, such as, for example, potting compounds, injection molding of a feedthrough is generally preferred.

For the above reasons, improvements in the design of the feedthroughs for electrochemical cells are needed, particularly to provide an adequate feedthrough insulation system for low profile electrochemical cells. The present invention, as described below, provides such improvement and overcomes the problems described above and those problems which will become apparent to one skilled in the art from the detailed description provided below.

SUMMARY OF THE INVENTION

An electrical feedthrough apparatus of the present invention includes a ferrule having an exterior surface and an interior opening about a longitudinal axis therethrough. The interior opening extends along the longitudinal axis of the ferrule from a first end of the ferrule to a second end of the ferrule. An electrical conductor is glassed in the opening of the ferrule. A locating member is in contact with the exterior surface of the ferrule in proximity to the first end of the ferrule and has a length extending beyond the second end of the ferrule. A cavity is defined between the locating member and the ferrule and there is an insulating material in the cavity.

In one embodiment of the feedthrough apparatus, a lead is attached to the electrical conductor at the second end of the ferrule extending exterior to the cavity and the locating member includes an opening at an edge thereof through which the lead extends. Insulating material surrounds at least a portion of the lead extending exterior to the cavity.

In another embodiment of the feedthrough apparatus, the exterior surface of the ferrule includes a first wall at the first end of the ferrule and a second wall stepped inward relative to the longitudinal axis from the first wall defining a step therebetween. The locating member is in contact with at least one of the step and the second wall.

In yet another embodiment of the apparatus, the locating member is a cup having a base and an annular wall extending therefrom. The base has an opening sized for contact with the step and the second wall.

An electrochemical cell in accordance with the present invention includes a cell enclosure, an anode means, a cathode means, and a feedthrough apparatus like the feedthrough apparatus described in the above embodiments. The feedthrough apparatus is positioned in sealing connection with an opening in the cell enclosure. In one embodiment of the cell, the feedthrough for the cell has a height to diameter ratio of less than 0.5.

A method of forming a feedthrough apparatus in accordance with the present invention includes forming a feedthrough subassembly. The feedthrough subassembly is formed by providing a ferrule having an exterior surface and an interior opening about a longitudinal axis therethrough. The interior opening extends along the longitudinal axis of the ferrule from a first end of the ferrule to a second end of the ferrule. An electrical conductor is glassed in the opening of the ferrule and a locating member is positioned onto the ferrule in contact with the exterior surface of the ferrule in proximity to the first end of the ferrule. The locating member has a length extending beyond the second end of the ferrule. The feedthrough subassembly is then located at a position in a mold using the locating member and held in the position using the locating member during the injection of insulating material into the mold.

In one embodiment of the method, the mold includes a first and second mold portion and the locating and holding steps include the steps of locating the feedthrough subassembly in the first mold portion and the second mold portion is applied to at least the locating member of feedthrough subassembly extending beyond the second end of the ferrule with sufficient pressure to hold the subassembly in the position during the injection of insulating material.

DETAILED DESCRIPTION OF THE EMBODIMENTS

Figure 1:
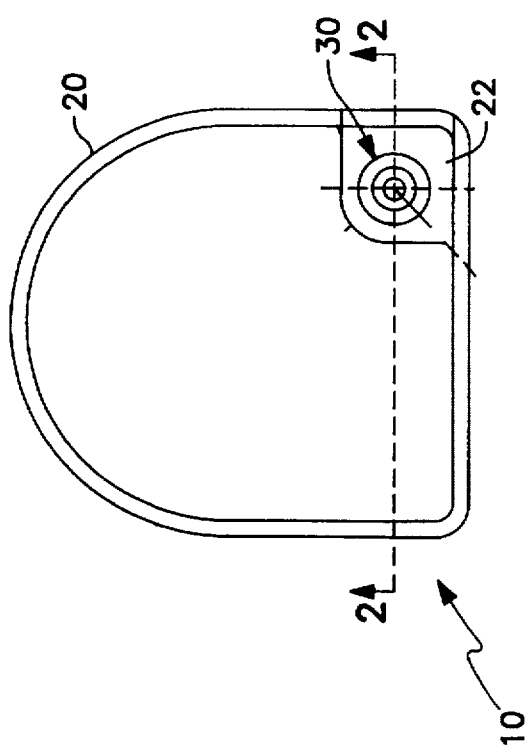
FIG. 1 is a top plan view of a lithium/iodine cell having a feedthrough apparatus in accordance with the present invention.

A lithium/iodine cell 10 incorporating a feedthrough apparatus 30 in accordance with the present invention is shown in FIG. 1–6. The lithium-iodine cell 10 includes a cell enclosure 20. The cell enclosure 20 includes an upper member 23 and a lower member 26. The upper member 23 includes a shelf 22 having an opening defined by annular surface 24. The feedthrough apparatus 30 is welded to the annular surface 24 after being injection molded and processed as further described below. The cell enclosure 20, shaped as shown in FIG. 1, is relatively thin as compared to its width. For example, the cell enclosure thickness T may be less than 0.5 inches or even 0.2 inches.

The lithium-iodine cell 10 further includes anode means comprising lithium plates, or elements 27, having an anode current collector element 80 (part of the feedthrough apparatus 30), sandwiched or positioned therebetween. The current collector 80 can be a wire or a relatively thin strip of nickel, stainless steel, or other similar metal. Preferably, the collector is a thin strip of nickel or stainless steel.

Further included in the lithium/iodine cell 10 is an iodine cathode means including a region of cathode material 18 within cell enclosure 20. The cathode material 18 operatively contacts the exposed surfaces of the lithium elements 27 and operatively contacts the inner surface of the cell enclosure 20. The cell enclosure is constructed of a metal, such as, for example, stainless steel. The cell enclosure, being of an electrically conducting material, serves as a cathode current collector.

The cathode material 18 comprises a charge transfer complex of an organic electron donor component material and iodine. The electron donor can be any organic compound having a double bond or an amine group. The electron donor functions to give iodine sufficient conductivity. One preferred form of the organic donor is poly-2-vinylpyridine (P2VP).

For proper functioning of the electrochemical cell 10, the iodine-containing cathode material 18 is insulated from direct contact with any portion of the current collector 80 sandwiched between the lithium elements 27 of the anode and lead or pin 50 of the feedthrough assembly 30. In particular, any migration of the iodine-containing cathode material 18 directly to the anode current collector 80 or directly to the anode lead or pin 50, instead of reacting with the lithium element 27, will result in the condition of electronic conduction, thereby creating an electrical short circuit condition in the cell.

On the other hand, when the iodine-containing cathode material 18 contacts only the lithium elements 27 of the anode means, a solid lithium-iodide electrolyte begins to form at the interface. In the present illustration, this formation occurs at the outer or oppositely disposed surfaces of the lithium elements 27. An electrical potential difference will exist between the anode lead 50 and the cathode collector or container 20 which contacts the iodine containing cathode material 18. The mechanism by which the foregoing is accomplished is believed to include migration of lithium ions through the electrolyte whereby the lithium ion is the ionic species in the cell. The exact mechanism by which the iodine containing cathode material 18 and lithium elements 27 come into operative contact is not known.

The cell 10 and feedthrough assembly 30 configured in accordance with the present invention advantageously prevents electrical short circuit situations resulting from migration or flow of cathode material 18. Further, the configuration of the feedthrough assembly 30 and insulation system thereof in accordance with the present invention provides for a long path length for any leakage that may occur.

The feedthrough apparatus 30 utilized in the lithium/iodine cell 10 shall be described in detail with reference to FIGS. 2–6. The feedthrough assembly 30 includes a ferrule 32 having a pin 50 glassed therein as shown in FIG. 6. The ferrule 32 is formed of a metal conductive material as is pin 50. The lead pin 50 and ferrule 32 may both be made of stainless steel or any other appropriate conductive material. Ferrule 32 includes an exterior surface 42 and an interior annular surface 38 defining an annular opening therein along longitudinal axis 40. The pin 50 is held in position in ferrule 32 and insulated from the ferrule 32. In particular, the pin 50 is insulated from the interior annular surface 38 of ferrule 32 by means of a glass seal 52. It should be readily apparent to one skilled in the art that the glass seal may include any sort of sealing materials and may be utilized in combination with washers, such as described in U.S. Pat. No. 4,460,664 entitled "Electrochemical Cell for Facilitating Hermeticity Leakage Testing of an Electrical Feedthrough," assigned to the assignee hereof, and incorporated herein by reference. The glass seal or sealing materials utilized for holding the pin 50 along longitudinal axis 40 of ferrule 32 may include any glasses suitable for use in such feedthrough devices for glassing electrical conductors in ferrules such as those described in U.S. Pat. No. 5,306,581 entitled "Battery with Weldable Feedthrough" assigned to the assignee hereof and incorporated herein by reference.

Figure 4:
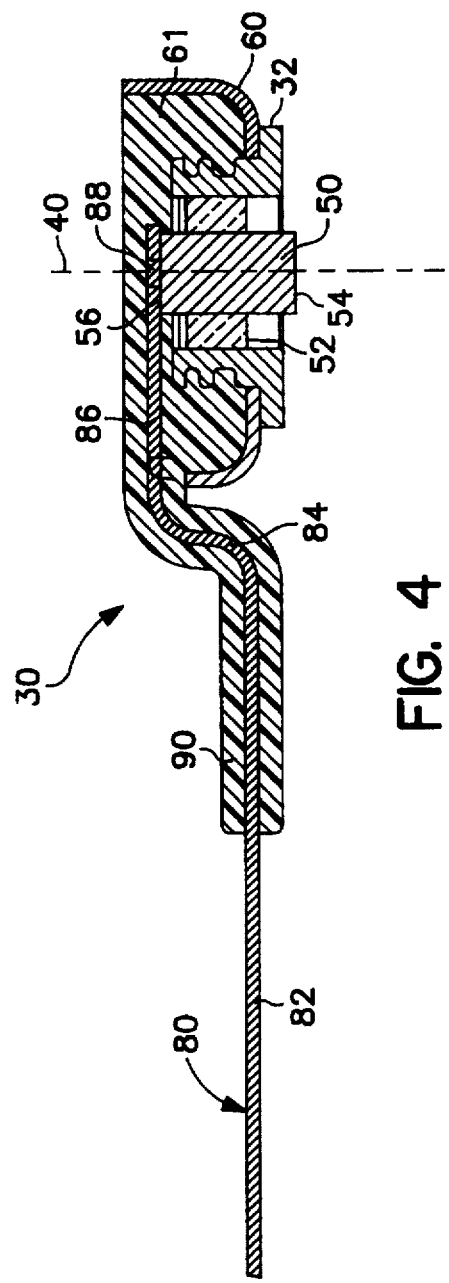
FIG. 4 is a cross-section view of the feedthrough apparatus of FIG. 3 taken at line B—B.

The pin 50 glassed into the ferrule 32 includes a first end 54 and a second end 56. An open or unglassed area 37 about the first end 54 of the pin 50 facilitates connection of the pin 50 to an implantable device such as an implantable pulse generator (IPG). The second end 56 of the pin 50, as shown in FIG. 4, is electrically connected to the anode current collector 80.

The ferrule 32 includes a first end 34 and a second end 36. The exterior surface 42 of the ferrule 32 includes a first annular wall 44 at the first end 54 of the ferrule 32 spaced a particular distance from longitudinal axis 40 and a second annular wall 46 spaced a lesser distance from, or inward relative to, longitudinal axis 40, as compared to the first annular wall 44. The first annular wall 44 and second annular wall 46 are therefore stepped relative to one another and define a step 48 therebetween.

Between the second annular wall 46 and the second end 36 of the ferrule 32 along the exterior surface 42, ferrule 32 includes at least one rib, or groove 43, preferably a plurality of such grooves or ribs 43 as shown. The ribs 43 facilitate anchoring of the insulating material 90 injection molded about the ferrule 32 as discussed further below and shown in FIG. 4. The ribs 43 also create a longer leak path to the position where the current collector 80 and glassed pin 50 interface. Further, as would be known to one skilled in the art, the ferrule grooves or ribs 43 may be toughened to facilitate adhesion between the ferrule 32 and the insulating material 90.

Figure 5:
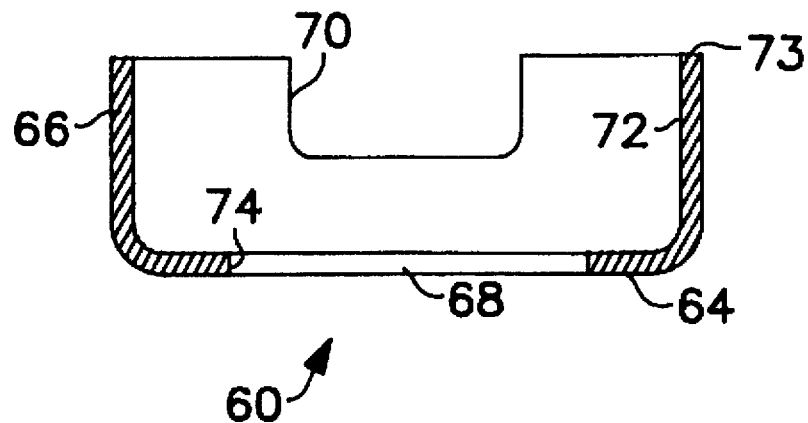
FIG. 5 is a cross-section view of the cup of the feedthrough apparatus of FIG. 4 along line C—C of FIG. 3.
Figure 6:
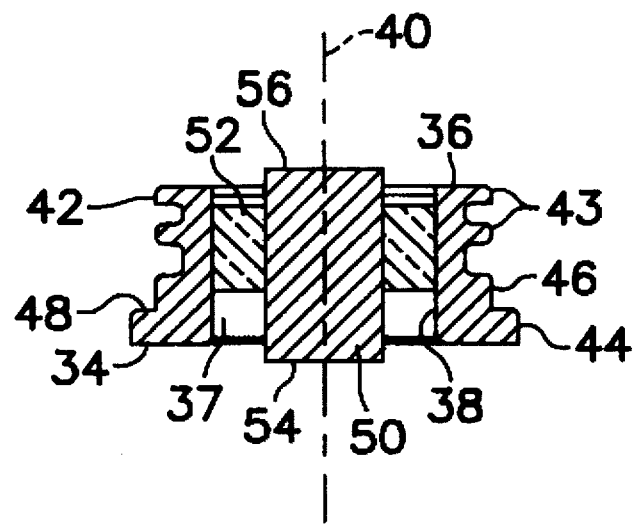
FIG. 6 is a cross-section view of the ferrule with the pin glassed therein of the feedthrough apparatus of FIG. 4 taken along line B—B of FIG. 3.

The feedthrough assembly 30 further includes a locating member, or as shown in FIG. 5, a cup 60 for use in locating the assembly 30 (without insulator 90) and sealing to a mold for injection molding of the feedthrough with insulating material 90 as described further below. The cup 60 is in contact with the second annular wall 46 of ferrule 32 and step 48 of ferrule 32. The cup 60, as shown in FIG. 5, includes a base 64 and an annular wall 66 extending substantially perpendicularly therefrom. Base 64 includes an engagement or contact surface 74 defining an annular opening 68 therein. The engagement or contact surface 74 is for contact with the second annular wall 46 of the ferrule 32 and the outer surface of the base 64 is for contact with the step 48 of the ferrule 32 as shown in FIG. 4. The cup 60 is machined or formed of an appropriate metal, preferably stainless steel. The opening 68 is sized for being placed over the second end 36 of ferrule 32 and pressed into place in contact with the second annular wall 46 and step 48 of ferrule 32.

In addition to annular opening 68, the cup 60 includes a slot or opening 70 at an edge of the annular wall 66. Slot 70 facilitates extending the current collector 80 in a perpendicular direction with respect to longitudinal axis 40 of the ferrule 32 to the exterior of the cup 60.

In addition to the cup 60 being used during the injection molding process to hold the feedthrough assembly in place and sealing to the mold when molding the insulating material 90, the cup or locating member also provides other benefits for the insulation system of the feedthrough system. For example, it creates a long leak path for the cathode material 18 to reach the position where the current collector 80 and the glassed pin 50 interface.

The locating member may alternatively be a cylindrical shaped member. The cylindrical shaped member may include a first end and a second end with the first end in contact with the second annular wall 46 and step 48 of the ferrule 32. Further, the cylindrical shape locating member would have an opening similar to cup 60 in the wall at the second end for facilitating the extension of current collector 80 therethrough such that current collector 80 could be positioned perpendicular to the longitudinal axis 40 of the ferrule 32. Further, other configurations of the locating member which would perform the functions described herein may be possible without departing from the scope of the invention as defined in the accompanying claims. For example, a tapered locating member may be utilized.

The current collector 80 of the feedthrough assembly 30 includes a first flat portion 82, a second flat portion 86, and a curved portion 84 between the first and second flat portions 82 and 86. The second flat portion 86 includes a current collector tab 88 at its end. The current collector tab 88 is spot welded or laser welded to the second end 56 of the pin 50. The current collector 80 is centered in the opening or slot 70 of the cup 60. As indicated previously, the current collector 80 can be a wire or a strip of nickel or stainless steel, preferably the strip. The collector 80 is formed to its desired shape prior to being welded to the second end 56 of the pin 50.

Cup 60 is of a length, along the longitudinal axis 40, that extends beyond the second end 36 of ferrule 32, and further beyond the second end 56 of pin 50 having the current collector tab 88 welded thereon. As such, the cup 60 forms a open cavity 61 between the inner surface 72 of the cup 60 and the exterior surface 42 of ferrule 32 encompassing the interface of the current collector 80 and pin 50. Injection molded insulating material 90 fills the cavity 61 between the interior surface 72 of cup 60 and exterior surface 42 of ferrule 32. Further, the insulating material 90 is formed about a portion of current collector 80 extending to the exterior of cavity 61.

The injection molded insulating material 90 is a material which, in addition to being a nonconductor of electricity, also is nonreactive with iodine, i.e., does not exhibit electronic conduction when exposed to iodine. Some materials found to perform satisfactorily are fluoropolymer materials including ethylene-chlorotrifluoroethylene (E-CTFE) and ethylene-tetrafluoroethylene (E-TFE) which can be injection molded. Any other suitable insulating materials that can be injection molded and having similar characteristics may also be used for the insulating material 90.

As described in the Background of the Invention section herein, adequate insulation systems using injection molding are currently difficult to generate for low profile feedthroughs, particularly because with conventional methods of injection molding of feedthroughs the ferrules must have adequately sized shoulders for locating the feedthrough in the injection mold, sealing the feedthrough to the injection mold, and holding the feedthrough in place within the injection mold. Without such a shoulder, the feedthrough assembly would not achieve an adequate insulation distance as required for the reliability of the electrochemical cell. The method in accordance with the present invention forms the feedthrough assembly 30 such that a reliable insulation configuration is possible. Particularly, the present invention is beneficial for feedthroughs having a height to diameter ratio of less than 0.5.

Figure 7:
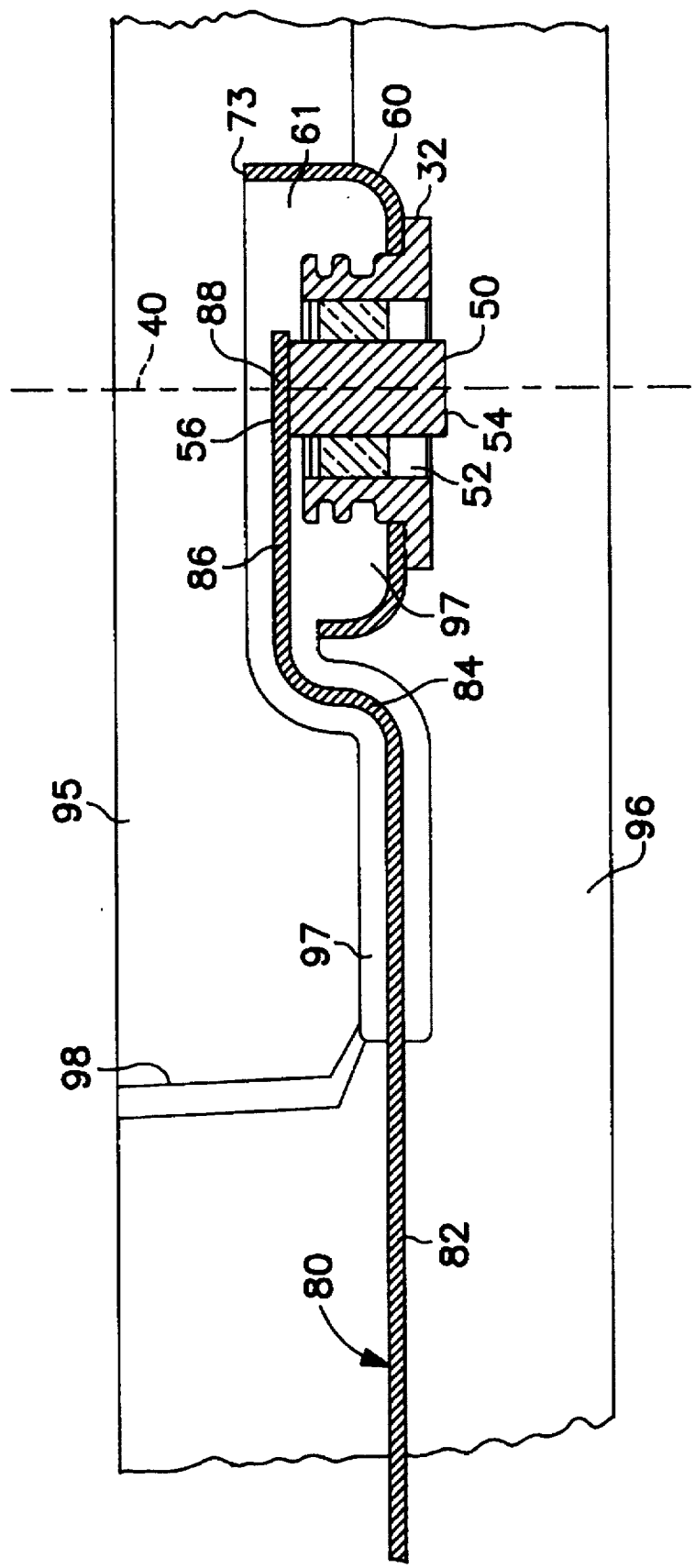
FIG. 7 is a cross-section view of a subassembly of the feedthrough apparatus as shown in FIG. 4 positioned in a mold prior to injection molding.

The method for forming the feedthrough assembly 30 in accordance with the present invention is described with reference to FIGS. 2-7, with particular emphasis on FIG. 7. FIG. 7 shows a subassembly of the feedthrough apparatus 30 positioned or located in an injection mold and sealed to the injection mold. The subassembly includes all the elements of the feedthrough apparatus 30 except for the insulating material 90 which is injected using the mold. The injection mold, includes mold portions 95 and 96 which when the subassembly is positioned therein forms mold cavity 97 into which the insulating material is injected. Cavity 97 includes open cavity 61 formed between the interior surface 72 of locating member 60 and the exterior surface 42 of ferrule 32.

In assembling the subassembly, pin 50 is glassed into the ferrule 32 along longitudinal axis 40 in a manner known to those skilled in the art. After glassing the pin 50, a locating member 60, which may be either a cup or a cylindrical sleeve as previously described, or any other member which may perform the same functions thereof, is pressed onto the ferrule 32 such that a cavity is formed about the exterior surface 42 of ferrule 32. For example, when using cup 60, the base 64 is in contact with step 48 of the ferrule and contact surface 74, which defines the annular opening 68 of cup 60, is in contact with the second annular wall 46 of the ferrule 32. The cup 60 forms cavity 61 between the inner surface 72 of the cup 60 and the exterior surface 42 of the ferrule 32. The cavity 61 is such that when filled with an insulating material 90, the current collector 80 interface with pin 50 is insulated.

A strip of nickel or stainless steel is formed into current collector 80 having a collector tab 88 thereon. The current collector 80 is then positioned with the tab 88 on the second end 56 of pin 50 and is either spot welded or laser welded to the pin 50. The current collector 80 is orientated substantially perpendicular to the longitudinal axis 40 so that it is centered in the slot 70 of cup 60.

The subassembly is then located or positioned into mold portion 96. The mold portion 96 is sized for forming the insulating material about the subassembly as desired. The mold portion 95 is also sized for forming the insulating material about the subassembly as desired. Together the mold portions 95 and 96 and locating member 60 form mold cavity 97 when the mold portion is clamped on top of the cup 60 and on the section of the first flat portion 82 of current collector 80 that extends to the exterior of cup 60 and which is not to be insulated. The downward pressure of mold portion 95 on edge 73 of locating member 60 holds the ferrule in place during the injection molding process.

Figure 2:
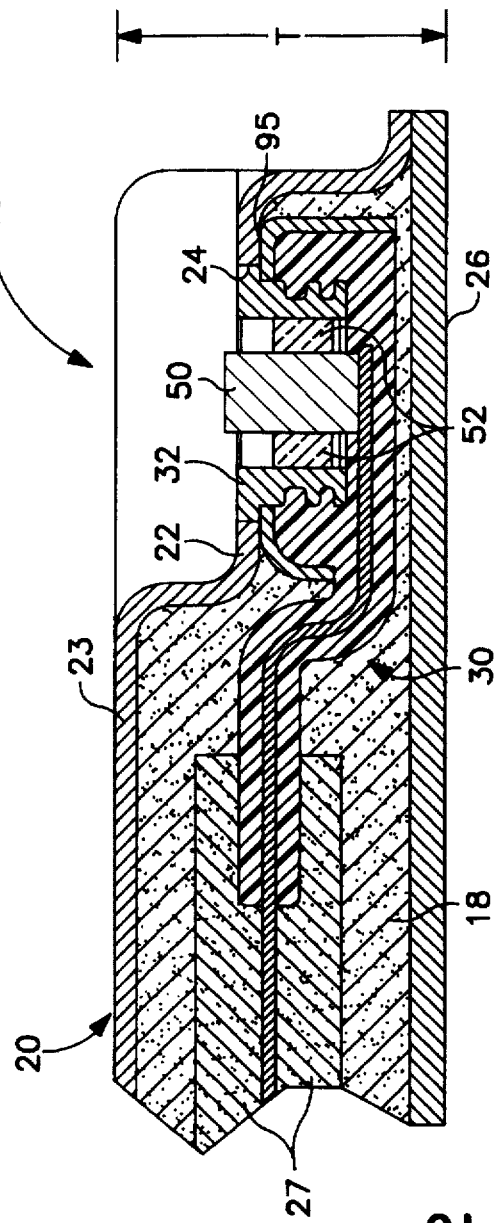
FIG. 2 is a partial cross-section view of the lithium/iodine cell of FIG. 1 taken along line A—A showing the feedthrough apparatus in accordance with the present invention.
Figure 3:
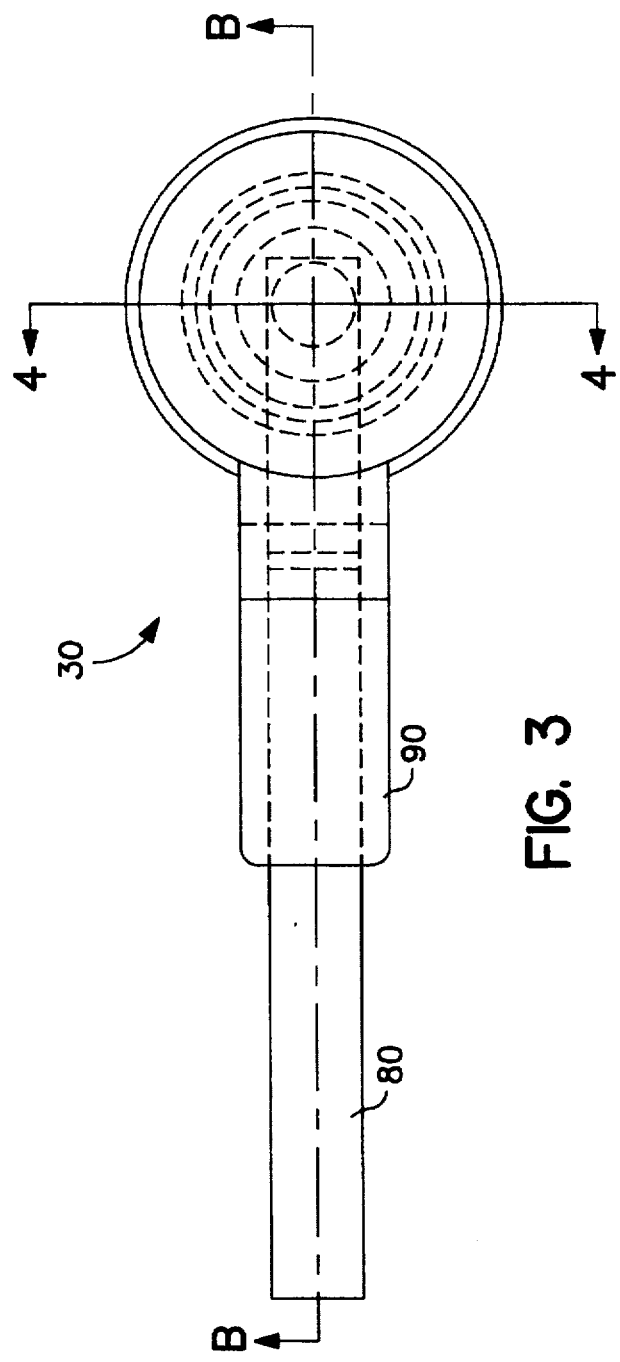
FIG. 3 is a top plan view of the feedthrough apparatus of FIG. 2.

After the fluoropolymer insulating material has been injected through gate 98 and cured, the mold is removed, resulting in the feedthrough assembly 30 for attachment to the cell enclosure 20 of the lithium-iodine cell 10 after the pressing of lithium on the current collector 80 to form the lithium elements 27 as is known to one skilled in the art. With the use of high pressures in injection molding, a substantially good seal between the mold and the subassembly is necessary to prevent the subassembly from moving about with respect to the mold. With the use of the cup 60 as a locating means for the injection molding of the insulating material, a location within the mold is maintained and seal to the mold is maintained creating an adequate insulation configuration. The cup 60 positioned on the ferrule 32 also provides a step for welding the feedthrough assembly 30 to the cell enclosure 20 as shown in FIG. 2. The weld is made at the surface 24 of the cell enclosure 20.

Although the invention has been described with particular reference to preferred embodiments thereof, variations and modifications of the present invention can be made within a contemplate scope of the following claims, as is readily known to one skilled in the art.

What is claimed is:

1. An electrical feedthrough apparatus comprising:
   a ferrule having an exterior surface and an interior opening about a longitudinal axis therethrough, the interior opening extends along the longitudinal axis of the ferrule from a first end of the ferrule to a second end of the ferrule,
   an electrical conductor glassed in the opening of the ferrule;
   a locating member in contact with the exterior surface of the ferrule in proximity to the first end of the ferrule and having a length extending beyond the second end of the ferrule, a cavity being defined between the locating member and the ferrule; and
   an insulating material in the cavity.

2. The apparatus according to claim 1, wherein the apparatus further includes a lead attached to the electrical conductor at the second end of the ferrule extending exterior to the cavity, and further wherein the locating member includes an opening at an edge thereof through which the lead extends and the insulating material surrounds at least a portion of the lead extending exterior to the cavity.

3. The apparatus according to claim 1, wherein the exterior surface of the ferrule includes a first wall at the first end of the ferrule and a second wall stepped inward relative to the longitudinal axis from the first wall defining a step therebetween, the locating member in contact with at least one of the step and the second wall.

4. The apparatus according to claim 3, wherein the locating member is a cup having a base and an annular wall extending therefrom, the base having an opening sized for contact with the step and the second wall.

5. The apparatus according to claim 4, wherein the apparatus further includes a lead attached to the electrical conductor at the second end of the ferrule extending exterior to the cavity and at an angle with respect to the longitudinal axis, and further wherein the annular wall of the cup includes an opening at an edge thereof through which the lead extends to the exterior of the cavity.

6. The apparatus according to claim 3, wherein the locating member is a cylindrical shaped member having a first and second end, the first end of the cylindrical shaped member sized for contact with the step and second wall.

7. The apparatus according to claim 6, wherein the apparatus further includes a lead attached to the electrical conductor at the second end of the ferrule extending exterior to the cavity and at an angle with respect to the longitudinal axis and further wherein the cylindrical shaped member has an opening at the second edge thereof through which the lead extends to the exterior of the cavity.

8. The apparatus according to claim I, wherein the insulating material is a fluoropolymer.

9. An electrochemical cell including a cell enclosure, an anode means, a cathode means, and a feedthrough apparatus, the feedthrough apparatus comprising:

a ferrule having an exterior surface and an interior opening about a longitudinal axis therethrough, the interior opening extends along the longitudinal axis of the ferrule from a first end of the ferrule to a second end of the ferrule;

an electrical conductor glassed in the opening of the ferrule;

a locating member in contact with the exterior surface of the ferrule in proximity to the first end of the ferrule and having a length extending beyond the second end of the ferrule, a cavity being defined between the locating member and the ferrule, one of the ferrule or locating member being in sealing connection with an opening in the cell enclosure; and an insulating material in the cavity.

10. The cell according to claim 9, wherein the feedthrough has a height to diameter ratio of less than 0.5.

11. The cell according to claim 9, wherein the feedthrough apparatus further includes a lead attached to the electrical conductor at the second end of the ferrule extending exterior to the cavity, and further wherein the locating member includes an opening at an edge thereof through which the lead extends and the insulating material surrounds at least a portion of the lead extending exterior to the cavity.

12. The apparatus according to claim 9, wherein the exterior surface of the ferrule includes a first wall at the first end of the ferrule and a second wall stepped inward relative to the longitudinal axis from the first wall defining a step therebetween, the locating member in contact with at least one of the step and the second wall.

13. The cell according to claim 12, wherein the locating member is a cup having a base and an annular wall extending therefrom, the base having an opening sized for contact with the step and the second wall.

14. The cell according to claim 13, wherein the feedthrough apparatus further includes a lead attached to the electrical conductor at the second end of the ferrule extending exterior to the cavity and at an angle with respect to the longitudinal axis, and further wherein the annular wall of the cup includes an opening at an edge thereof through which the lead extends to the exterior of the cavity.

15. The cell according to claim 12, wherein the locating member is a cylindrical shaped member having a first and second end, the first end of the cylindrical shaped member sized for contact with the step and second wall.

16. The cell according to claim 15, wherein the feedthrough apparatus further includes a lead attached to the electrical conductor at the second end of the ferrule extending exterior to the cavity and at an angle with respect to the longitudinal axis and further wherein the cylindrical shaped member has an opening at the second edge thereof through which the lead extends to the exterior of the cavity.

* * * * *

UNITED STATES PATENT AND TRADEMARK OFFICE
CERTIFICATE OF CORRECTION

PATENT NO. : 5,643,694
DATED : July 1, 1997
INVENTOR(S) : Bernard F. Heller, Jr.

It is certified that error appears in the above-indentified patent and that said Letters Patent is hereby corrected as shown below:

C. 5 L. 44    "toughened" to be changed to "roughened"
C. 8 L. 63    "claim I," to be changed to "claim 1,"

Signed and Sealed this

Sixteenth Day of November, 1999

Attest:

Q. TODD DICKINSON

*Attesting Officer*    *Acting Commissioner of Patents and Trademarks*